Patented Mar. 8, 1938

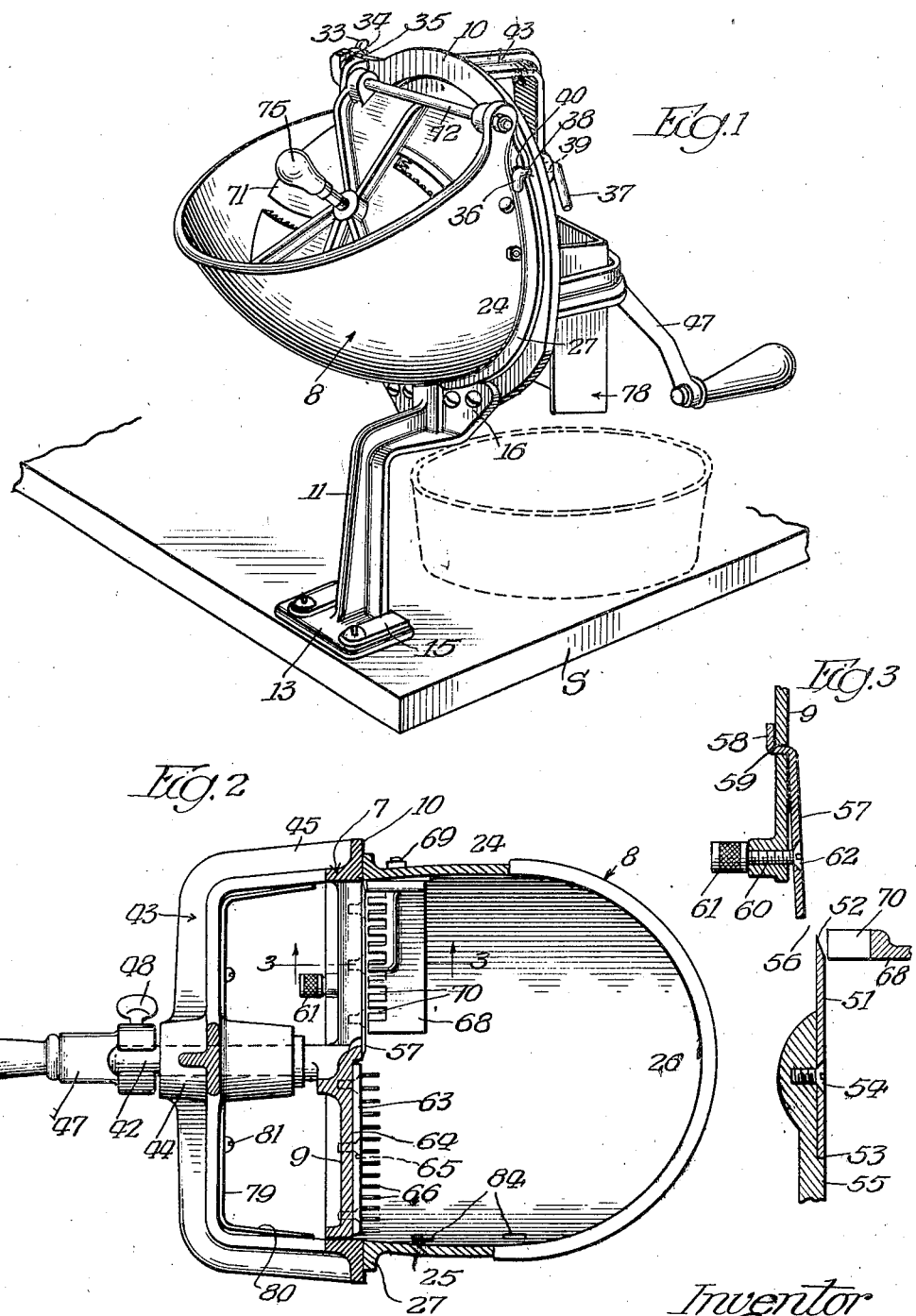

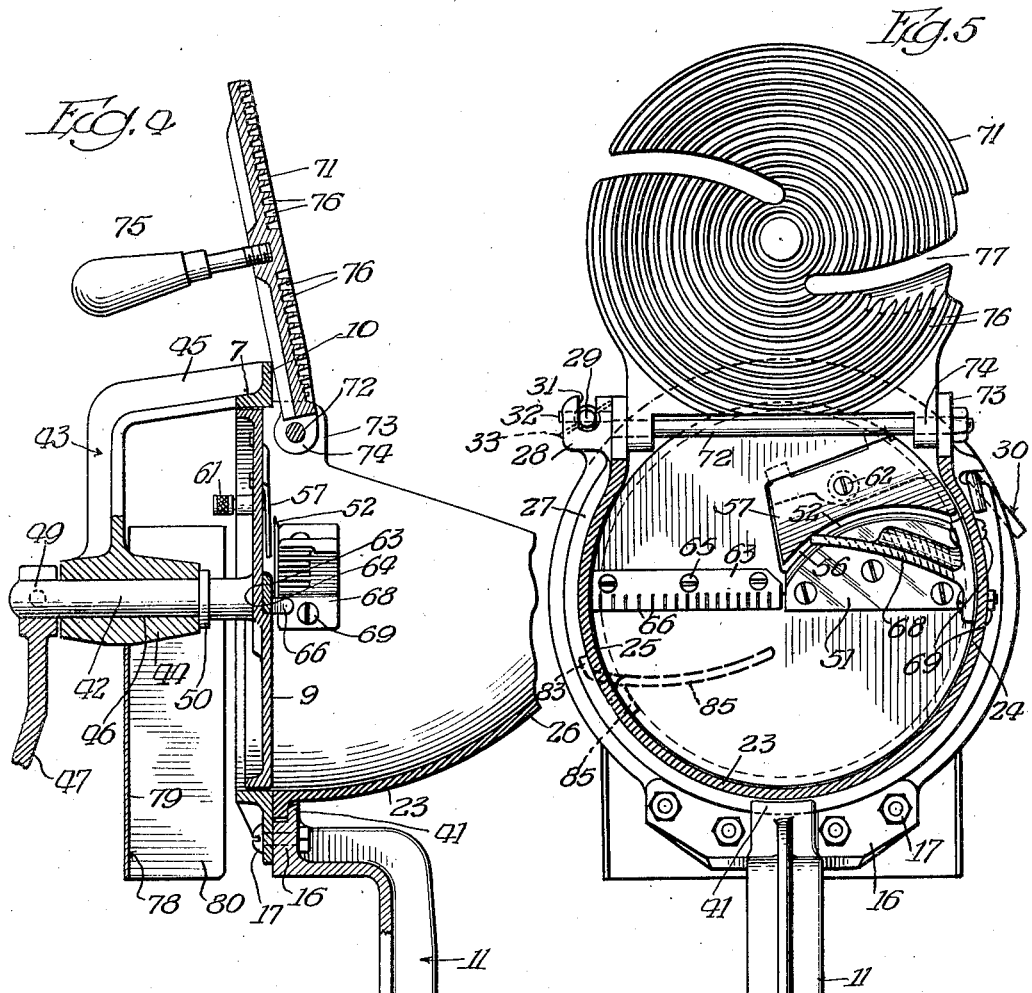
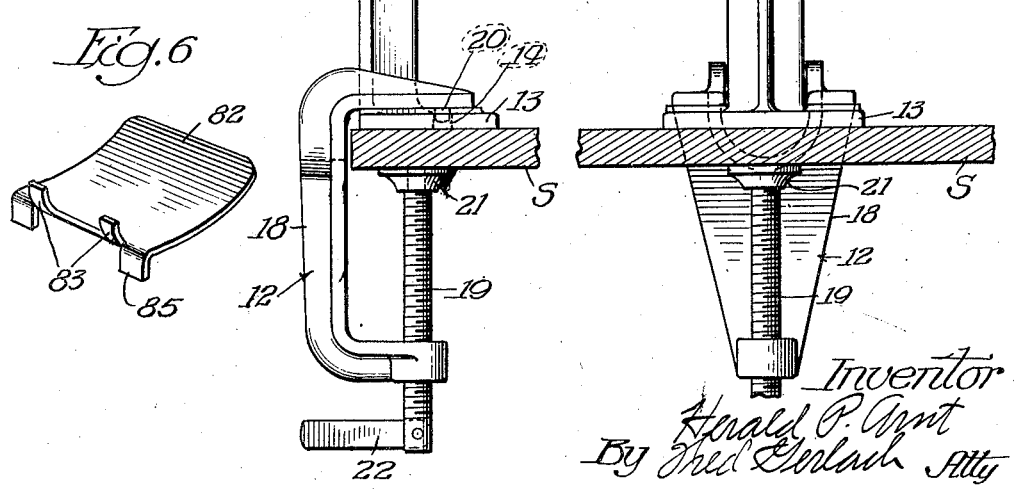

2,110,836

UNITED STATES PATENT OFFICE 2,110,836

VEGETABLE SLICER

Herald P. Arnt, Litchfield, Mich., assignor to The Artisan Company, Litchfield, Mich., a corporation of Michigan Application February 15, 1936, Serial No. 64,072

5 Claims. (Cl. 146—115)

The present invention relates generally to slicers for vegetables and other food products. More particularly the invention relates to that type of slicer which is manually operated and comprises (1) a ring shaped frame having means at the bottom portion thereof whereby it may be attached to a supporting surface such for example as a table top; (2) a hopper at one side of the frame for receiving the vegetables and directing them through the frame; and (3) a disk-like head which is rotatably mounted in the frame and is provided with a knife for slicing the vegetables as the latter are directed or fed through the frame.

One object of the invention is to provide a vegetable slicer of this type in which the hopper embodies a member of novel design for precluding the vegetables from rotating with the head and is detachably connected to the frame so that when desired it may be disconnected for cleaning purposes.

Another object of the invention is to provide a vegetable slicer of the type under consideration in which the knife equipped head has a pintle and a crank at the outer end of the pintle for turning purposes and the frame embodies on the discharge side thereof an integral bracket which is of novel design and construction and has a bearing for the pintle on the head.

Another object of the invention is to provide a vegetable slicer of the character last mentioned in which the crank is removably connected to the pintle and the knife equipped head after removal of the handle from the pintle and the hopper from the frame may be removed from the frame for cleaning or replacement purposes.

Another object of the invention is to provide a vegetable slicer of the type and character under consideration in which the head embodies a knife guard which is movable or adjustable relatively to the knife so that the operator or user may cut the vegetables to the desired thickness.

A further object of the invention is to provide a vegetable slicer of the aforementioned type in which the bracket on the discharge side of the frame carries a deflector for directing the sliced vegetables downwardly after leaving the head.

A still further object of the invention is to provide a vegetable slicer which is generally of new and improved construction, may be manufactured at a low and reasonable cost, and embodies novel means for clamping the frame in place and also a removable plate in the hopper for directing celery and like vegetables into engagement with the head for cutting purposes.

Other objects of the invention and the various advantages and characteristics of the present slicer will be apparent from a consideration of the following detailed description.

The invention consists in the several novel features which are hereinafter set forth and are more particularly defined by claims at the conclusion hereof.

In the drawings which accompany and form a part of this specification or disclosure and in which like numerals of reference denote corresponding parts throughout the several views:

Figure 1 is a perspective of a vegetable slicer embodying the invention;

Figure 2 is a view partly in plan and partly in section showing in detail the construction of the bracket having the bearing in which the pintle of the knife equipped head is journaled;

Figure 3 is an enlarged sectional view taken on the line 3—3 of Figure 2 and showing the manner in which the knife guard is adjustable relatively to the knife so that the operator or user may set the slicer to cut the vegetables to the desired thickness;

Figure 4 is a vertical longitudinal section of the slicer;

Figure 5 is a vertical transverse sectional view; and

Figure 6 is a perspective of the plate which is adapted to be attached to the hopper when it is desired to feed or direct celery or like vegetables one at a time towards the head.

The vegetable slicer which forms the subject matter of the invention is adapted to be operated manually and comprises as the main or essential parts thereof a ring-shaped frame 7, a hopper 8 at one side of the frame, and a knife equipped head 9.

The frame 7 is formed of cast metal. It is adapted to support the hopper and the knife-equipped head as hereinafter described and embodies an integral outwardly extending flange 10. A standard 11 is attached to the lower portion of the frame and when alone or in conjunction with a C-clamp 12 constitutes an attaching instrumentality whereby the slicer may be rigidly secured in an upright position to the marginal part of a supporting structure S such for example as a table top, board or shelf. The standard 11, as shown in Figure 1, embodies a flat base 13 at the lower end thereof. This base is preferably formed as an integral part of the standard and has a pair of laterally spaced holes 14 for receiving respectively a pair of screws 15. The latter are used or employed when it is desired permanently to secure the slicer in place. The upper end of the standard extends horizontally and is provided with an upstanding arcuate lug 16 which fits against the bottom portion of the outwardly extending annular flange 10 on the ring-shaped frame and is secured to the flange by means of bolts 17. The C-clamp 12 is adapted for use when it is desired releasably or detachably to connect the standard to the supporting structure S. As shown in Figure 4 the clamp comprises a C-shaped frame 18 and a clamping screw 19. The upper end of the frame is bifurcated or forked so as to straddle the lower end of the standard 11. It is adapted to fit against the top face of the base 13 and embodies a pair of knob-like protuberances 20 on the under face thereof. The protuberances are spaced apart and are adapted when the clamp is employed with the standard to fit within the holes 14 and prevent relative horizontal displacement of the upper end of the clamp with respect to the base 13. The clamping screw 19 extends through an internally threaded, vertically extending socket in the lower leg of the C-shaped frame 18 of the clamp and embodies a washer 21 at its upper end and a laterally projecting handle or turning element 22 at its lower end. The washer 21 is adapted to underlie the supporting structure S and coacts with the upper bifurcated end of the clamp to hold the base 13 in clamped relation with respect to the support. By reason of the fact that the upper end or leg of the clamp is bifurcated the clamp is reversible with respect to the base 13 and consequently the slicer may be attached to the supporting structure S in such manner that the hopper 8 overlies the support and the frame and knife equipped blade are disposed or positioned outwardly of said structure or in such manner that the hopper is disposed outwardly of the structure and the head and frame overlie the latter. When it is desired to attach the slicer so that the hopper 8 overlies the supporting structure S and the frame and knife-equipped head are disposed outwardly of the latter the base 13 at the lower end of the standard 11 is positioned on the supporting structure as shown in Figure 4. After the base is so positioned, the clamp 12 is arranged so that the upper or bifurcated leg straddles the lower end of the standard and the protuberances 20 fit within the holes 14. When the slicer is secured to the supporting structure, as shown in Figure 4, the vegetables after being sliced are discharged downwardly at a point to one side of the supporting structure and may, if desired, be caught in a pail or bucket (not shown). When it is desired to attach the slicer so that the hopper is disposed outwardly of the structure and the head and frame overlie the latter the base 13 at the lower end of the standard 11 is positioned on the supporting structure as shown in Figure 1. After the base is so positioned the clamp 12 is arranged so that the upper or bifurcated leg engages the portion of the base 13 that is outwardly of the standard 11. In arranging the upper end of the clamp in this position the protuberances 20 are positioned so that they fit within the holes 14. When the slicer is secured to the supporting structure S, as last described or as shown in Figure 1, the vegetables after being sliced drop towards the structure S and, if desired, may be caught in a pan P on the supporting structure S. The standard 11 and the base 13, together with the clamp 12, constitute means whereby the slicer may be secured in place either permanently or detachably, and with the hopper 8 over the supporting structure or to one side of the latter.

The hopper 8 is in the form of a one-piece casting and comprises a bottom 23, a pair of side walls 24 and 25, and an end wall 26. The top of the hopper is open so as to permit the operator or user of the slicer to place into the hopper the vegetables that are to be sliced or cut. The inner end of the hopper is also open so that the vegetables may be fed against the knife-equipped head 9 for slicing purposes. The bottom and side walls of the hopper are curved or rounded, as shown in the drawings. The end wall 26 is also curved and slopes downwards (see Figure 4) so that the vegetables in the hopper tend to move toward the head 9. At the inner end portions of the bottom and side walls the hopper is provided with an outwardly extending flange 27. This flange is preferably formed as an integral part of the hopper and fits against the outwardly extending flange 10 when the hopper is in connected relation with respect to the ring-shaped frame 7. As shown in the drawings, the flange 27 is shaped substantially conformably to the flange 10 and embodies an integral lug 28 which is positioned adjacent to the upper portion of the side wall 25 of the hopper. The hopper is detachably or releasably connected by means of a bolt 29 and a latch 30. One end of the bolt 29 extends into a vertically extending slot 31 in the lug 28 and is pivotally connected to a pin 32 which extends across the slot, is carried by the lug, and permits the bolt to swing vertically. The outer or distal end of the bolt is provided with a wing nut 33 and is adapted to fit within a slot 34 in a lug 35 on the outwardly extending flange 10. The lug 35 is preferably formed as an integral part of the flange 10 and is positioned directly opposite to the lug 28. The wing nut 33 serves when tightened to clamp the two lugs 28 and 35 together and thus to hold the hopper and frame in connected relation. The latch 30 is mounted on the flange 10 at a point directly opposite to the lug 35. It is U-shaped and comprises a pair of substantially parallel arms 36 and 37 and an intermediate or a connecting piece 38. The connecting piece extends through a hole 39 in the flange 10 and permits the arms 36 and 37 to swing laterally. The end of the connecting piece 38 that is on the hopper side of the frame projects beyond the flange 10 and is adapted to fit in a notch 40 in the flange 27 in the hopper. The arm 36 of the latch is adapted when the projecting end of the connecting piece 38 is disposed in the notch 40 to be swung downwards into lapped relation with the flange 27 and serves as a releasable locking member for holding the flanges 10 and 27 in connected relation. The arm 37 is longer than the arm 36 and is adapted to be used as a handle for swinging the arm 36 of the latch into and out of its operative position. When the hopper is in connected relation with the frame, the bottom portion of the flange 27 rests on the upstanding arcuate lug 16 at the upper end of the standard 11. Said bottom portion of the flange 27 is held in place against the bottom portion of the flange 10 on the frame 7 by means of an upstanding lip 41 on the lug 16. Said lip, as shown in Figure 4, is designed to fit against the outer face of the flange 27. In connecting the hopper 8 to the frame 7, the bottom portion of the flange 27 is placed on the lug 16 between the lip 41 and the bottom portion of the flange 10. Thereafter the upper portion of the hopper is swung into abutting relation with the frame. After swinging the hopper into abutting relation with the frame the arm 37 of the latch 30 is swung downwards so as to bring the arm 36 against the outer face of the flange 27. After the latch 30 is shifted or manipulated into its operative position the outer end of the bolt 29 is swung into the slot 34 in the lug 35 and the wing nut 33 is tightened so as to lock the lugs 28 and 35 together. In order to remove the hopper 8 from the frame it is only necessary to release the bolt 29 and open the latch 30 and to raise the hopper so as to disengage the bottom portion of the flange 27 from the lip 41.

The head 9 fits within and corresponds substantially in diameter to the circular opening in the frame 7. It embodies a pintle 42 and is supported by means of a spider-like bracket 43. The bracket is formed as an integral part of the frame and consists of a hub 44 and three legs 45. The legs radiate from the hub 44 and extend at right angles at the end portions thereof so that the hub is spaced from the frame. Two of the legs extend horizontally in opposite directions and the third leg is centrally disposed with respect to the other two and extends vertically and upwardly with respect to the hub. The hub, as shown in Figure 4, forms a bearing 46 in which the pintle 42 is journaled. The latter is fixedly secured to the central portion of the head 9 and is provided at its outer end with a crank 47 whereby the head may be rotated for slicing purposes. The hub end of the crank is bifurcated and embodies a set screw 48. The portion of the pintle that is directly inwards of the extreme outer end has a pair of notches 49 which receive the bifurcated hub end of the crank. The set screw 48 serves releasably to secure the crank to the pintle. Movement of the head in the direction of the discharge side of the frame is limited by means of a shoulder 50 which abuts against one end of the bearing forming hub 44 of the bracket 43. Movement of the head in the reverse or opposite direction is limited by means of the hub part of the crank 47. This part of the crank, as shown in Figure 4 of the drawings, abuts against the opposite or other end of the bracket hub 44. In order to remove the head for cleaning purposes it is only necessary to detach the hopper 8 from the frame and to disconnect the crank 47 from the pintle. After detachment of the hopper and removal of the crank from the pintle the head is free so that it may be slid out of connected relation with the bracket hub 44.

Slicing of the vegetables is effected by means of a semicircular knife 51 which is mounted on the front face of the head 9 and extends substantially radially from the center of the head. The rounded or curved margin of the knife is sharpened to form a cutting edge 52. The straight margin of the knife fits in a radially extending seat 53 in the front face of the head and is connected rigidly in place by means of screws 54. The seat 53 is formed in a rib or enlargement 55 which is formed as an integral part of the front of the head and serves to hold the knife 51 in spaced relation with respect to the face of the head. The portion of the head that is disposed directly in front of the curved cutting edge 52 of the knife is cut away to form an opening 56 through which the sliced parts of the vegetables are discharged. During rotation of the head the knife 51 swings around the frame 7 and slices the vegetables which are in contact with the front face of the head. The thickness of the cut is determined by means of a guard 57. The latter is located in front of the knife 51 and the trailing edge thereof is shaped so as to conform substantially to the curvature of the cutting edge 52 of the knife. The leading edge or margin of the guard is provided with a pair of laterally spaced tongues 58 which extend through slots 59 in the head 9 and form a pivotal connection whereby the guard is supported so that it may be swung or shifted to and from the cutting edge 52 and the thickness of the cut thus determined. Swinging of the guard to and from the cutting edge of the knife is effected by means of an adjusting screw 60. The latter extends through the head and is provided at one end thereof with a knurled head 61 for turning purposes. The other end of the screw extends through an aperture in the knife guard and embodies a head 62. The tongues 58 are preferably angled in such manner that the guard is under spring tension and tends to swing towards the knife 51. By turning the screw 60 in one direction the guard is controlled so that it moves towards the knife and hence tends to reduce or lessen the thickness of the cut. By turning the screw in the other direction the guard is swung towards the front face of the head and away from the knife with the result that the knife serves to effect a larger cut. The knife guard 57 constitutes simple means for determining or adjusting the knife cut.

To adapt the head 9 for use in preparing or making shoestring or Julienne potatoes the head includes in addition to the knife 51 a special knife 63. The latter extends radially with respect to the head and fits in a seat 64 in the front face of the head. Screws 65 serve fixedly to secure the special knife in place. The leading margin of the knife 63 is provided with a series of forwardly projecting blades 66. These blades are spaced equidistantly apart and project a small distance into the open end of the hopper (see Figure 2). When the hopper 8 is filled with peeled potatoes and the head is rotated by way of the crank 47 the knife blades 66 and the knife 51 successively encounter the portions of the potatoes that abut against the front face of the head. During each revolution of the head the blades 66 form long cuts in the potatoes and the knife 51 cuts the cut portion of the potatoes at right angles to the cuts that are made by the blades 66 and forms shoestring shaped potato pieces which pass through the opening 56 and then drop away from the discharge side of the frame 7. When it is desired to cut cabbage, lettuce and other vegetables without "shoestringing" action the knife 63 is either removed from the head by withdrawing the screws 65 or a head having one or more semicircular knives like the knife 51 is substituted for the head 9. The knife 63, as shown in the drawings, extends at an angle of approximately 180° with respect to the knife 51.

In order to prevent the vegetables from rotating with the knife-equipped head 9, the hopper 8 is provided with a finger-like member 68. This member is attached by bolts 69 to the inner face of the side wall 24 of the hopper and extends inwardly to a point near the center of the ring-shaped frame 7. The face of the member which is adjacent to the front face of the knife equipped head is substantially flush with the flange 27 and has arcuate slots 70 for accommodating the blades 66 as they travel around the frame during rotation of the head 9. When the hopper is filled with vegetables and the head is rotated for slicing purposes, the vegetables at the open end of the hopper strike against the finger shaped member 68 and hence cannot rotate with the head and are locked or held so that the knife 51 operates to slice or cut them.

The vegetables in the hopper 8 are forced or pushed towards the knife-equipped head 7 by means of a substantially circular plate 71. This plate is supported by a rod 72 so that it is free to swing downwards through the hopper. The rod 72 extends across the upper portion of the hopper and is carried by a pair of lugs 73 which extend upwardly from and are formed integrally with the upper portions of the side walls of the hopper. The plate 71 has a pair of laterally spaced lugs 74 which abut against the inner faces of the lugs 73 and have apertures or holes through which the rod 72 extends. A handle 75 is fixed to the central portion of the plate. When the hopper 8 is to be charged with vegetables for slicing purposes the plate 71 is swung upwards and out of the hopper as shown in Figure 4. During operation of the slicer the plate is swung downwards so that it operates to force the vegetables towards the knife equipped head. The plate is adapted to swing downwards through the hopper to a point wherein the inner face thereof engages the knife 51. By supporting or arranging the frame so that it swings to this point or position, it is possible to operate the slicer so that there are no uncut vegetable portions in the hopper after the slicing operation. In order to accommodate the projecting ends of the blades 66 of the knife 63 concentric circular grooves 76 are formed in the inner face of the plate. An arcuate notch 77 is formed in the plate and receives the finger-like member 68 when the plate is in its lower position in the hopper 8.

In order to direct the sliced vegetables downwardly a deflector 78 is provided. This deflector is formed of sheet metal and consists of a flat main piece 79 and a pair of in-turned side pieces 80. The main piece 79 extends parallel to the head and fits around the bearing forming hub 46 of the bracket 43. The side pieces 80 extend toward the head and fit against the outer ends of the two horizontal legs of the bracket. The sliced vegetable pieces pass through the opening 56 in the head and then strike against the deflector 79 and are directed downwards by the latter. Screws 81 extend through the main piece 79 of the deflector and into the horizontal legs of the bracket 43 and operate to hold the deflector in fixed relation with respect to the bracket.

In some instances it is desired to feed pieces of celery, one at a time, into the hopper and to cut the pieces transversely. In order to guide the pieces against the head so that the knife 51 effects the desired transverse cut a plate 82 is provided. This plate is substantially rectangular and embodies along one margin thereof a pair of fingers 83. The latter are adapted to extend through slots 84 in the side wall 25 of the hopper 8 and constitute means for releasably holding the plate in a substantially horizontal position (see Figure 5) across the open end of the hopper. Outwardly of the fingers 83 the plate is provided with a pair of depending fingers 85. The latter are adapted to engage the inner face of the side wall 23 of the hopper and serve after insertion of the fingers 85 in the slots 84 to hold the plate in place. When the plate is in place in the hopper the inner edge is substantially aligned with the flange 27 and pieces of celery or like vegetables may be placed on the plate and fed one at a time into the path of travel of the knife 51.

In using the slicer the hopper 8 is first filled with vegetables that are to be sliced. Thereafter the plate 21 is swung downwardly so as to urge or feed the vegetables toward the head 9. While pressure is placed on the plates 71 the crank 47 is turned so as to rotate the head. During rotation of the head the knife 51 successively cuts the vegetables into small pieces which are discharged through the opening 56 and are directed downwards by the deflector 78. In the event that it is desired to change the thickness of the cut it is only necessary to turn the adjusting screw 60 by manipulation of the knurled head 61.

The herein described vegetable slicer is exceedingly efficient in operation and since it consists of but a small number of parts it may be manufactured at a low and reasonable cost.

The invention is not to be understood as restricted to the details set forth, since these may be modified within the scope of the appended claims, without departing from the spirit and scope of the invention.

Having thus described the invention, what I claim as new and desire to secure by Letters Patent is:

1. A slicer comprising in combination a frame, a head mounted rotatably in the frame and having an opening extending therethrough, a hopper for receiving the material to be sliced and feeding it against the head and through the opening, a knife connected rigidly to the head so that the edge thereof faces one side of the opening and operative during rotation of the latter to slice the material as it is fed through the opening, and a guard for the knife overlying the opening, and provided with a tongue extending through a slot in the portion of the head that defines the other side of said opening and forming a pivotal connection whereby the guard may be swung to and from the knife in order to regulate the thickness of the sliced pieces of material.

2. A slicer comprising in combination a head mounted rotatably in the frame and having an opening extending therethrough, a hopper for receiving the material to be sliced and feeding it against one face of the head and through the opening, a knife connected rigidly to the head so that the edge thereof faces one side of the opening, and operative during rotation of the latter to slice the material as it is fed through the opening, a guard for the knife overlying the opening and provided with a tongue extending through a slot in the portion of the head that defines the other side of said opening and forming a pivotal connection whereby the guard may be swung to and from the knife in order to regulate the thickness of the sliced piece of material, and means for swinging the guard relatively to the knife comprising a screw extending through the head and provided adjacent to the other face of the head with a member whereby it may be turned for guard swinging purposes.

3. A slicer comprising in combination a vertically extending ring-shaped frame, a disk-like head mounted in the frame to rotate on a substantially horizontal axis and having an opening extending therethrough, a handle at one side of the frame for rotating the head, a hopper connected to the other side of the frame and adapted to receive the material to be sliced and to feed the same against the contiguous face of the head and through the opening, a knife associated with the opening and connected fixedly to said contiguous face of the head and having a substantially semicircular blade at the leading edge thereof operative to slice the material after it is fed through the opening, a knife guard positioned directly in front of the knife and having an arcuate trailing edge corresponding in shape to the substantially semicircular blade of the knife, said guard being pivotally connected to the head so that it is free to swing to and from the blade in order that the thickness of the sliced pieces of material may be regulated, and means for swinging the guard relatively to the knife comprising a screw extending through the head and provided at the side of the head that is adjacent to the handle with a head whereby it may be turned for guard swinging purposes.

4. A slicer comprising in combination a frame, a head rotatably mounted on the frame and having an opening extending therethrough, a hopper for receiving the material to be sliced and feeding and directing it against one face of the head and through the opening, a knife associated with the opening and operative during rotation of the head to slice the material as it is fed through the opening, a special knife for "shoestringing" purposes fixed to said one face of the head in opposed relation with respect to said first mentioned knife and having a plurality of laterally and substantially equidistantly spaced blades extending circumferentially with respect to the path of rotation of the head and projecting a small distance into the inner end of the hopper, and a plate for feeding the material through the hopper pivotally connected so that it is free to swing through the hopper into a position adjacent to said one face of the head, and having concentric grooves in the inner face thereof for accommodating the blades of the special knife when it is in said position.

5. In a slicer of the character described, the combination of a vertically extending, ring-shaped frame, a head mounted in the frame for rotation on a substantially horizontal axis and provided with a knife, a hopper with an open end adjacent to the head connected to the frame and provided with a slot in one of the side walls thereof and adjacent to its open end, and a plate for directing celery and like material against the head for slicing by the knife disposed in the inner or open end of the hopper and having a tongue extending into the aforesaid slot whereby it is detachably connected to the hopper.

HERALD P. ARNT.